Oct. 28, 1930.  W. E. BENTON  1,779,655
CHARACTER MIRROR
Filed Nov. 15, 1928
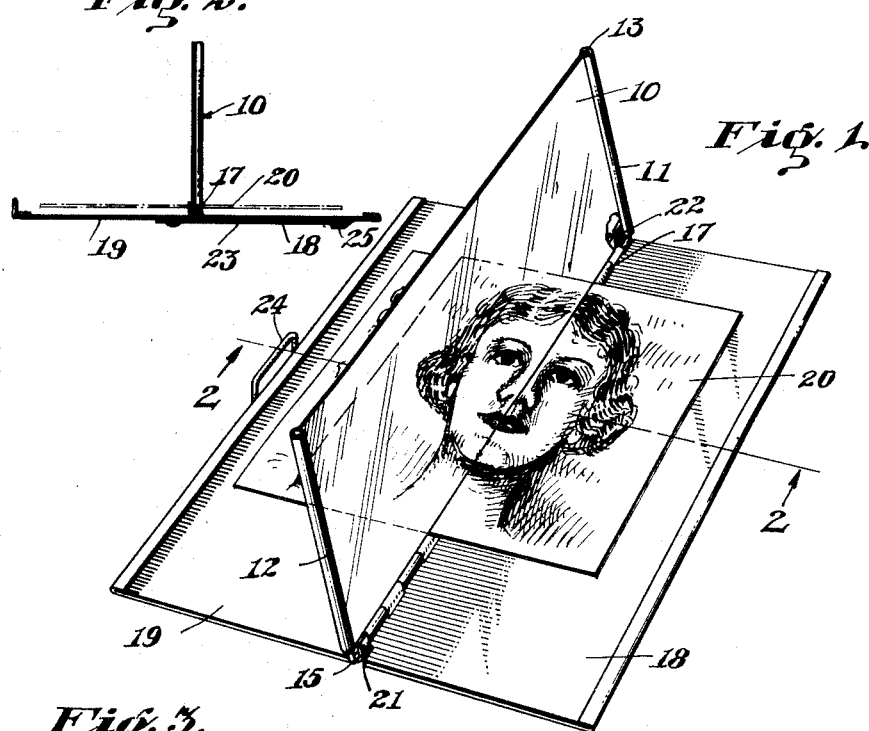
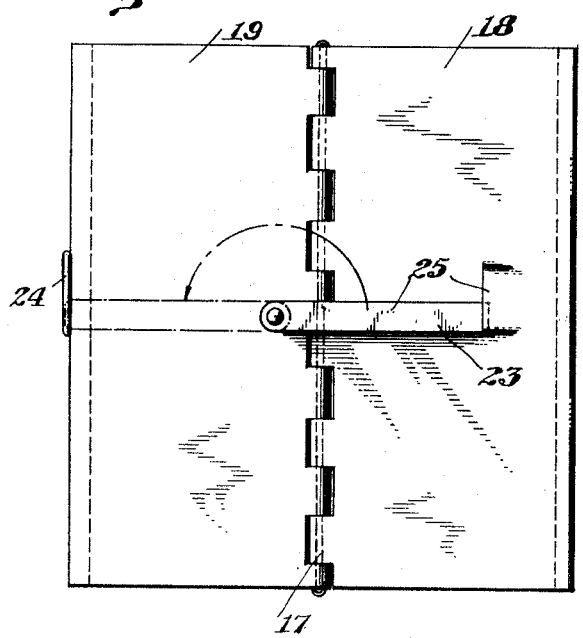
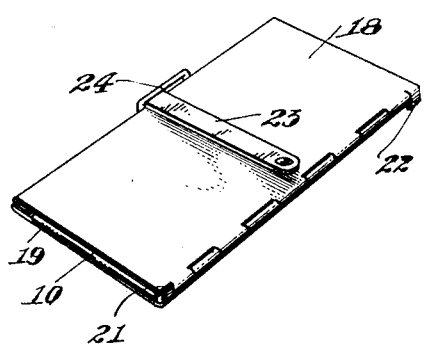
INVENTOR.
William E. Benton.
BY
Townsend, Loftus & Abbett.
ATTORNEYS.

Patented Oct. 28, 1930

1,779,655

UNITED STATES PATENT OFFICE

WILLIAM E. BENTON, OF LOS ANGELES, CALIFORNIA

CHARACTER MIRROR

Application filed November 15, 1928. Serial No. 319,701.

This invention relates to a device to be used by students in the study of phrenology and physiognomy, as it relates to character, and the invention is particularly concerned with a character mirror.

Students of phrenology and physiognomy have ascertained that facial expression is a direct index of character. Criminologists have presented a theory which is now abundantly proven, that the face of a criminal is not regular in its features, and that the two sides of the face divided on a vertical medium line, are materially different. This is to some extent true with the faces of all human beings, but in cases of criminals it has been found that a criminal who is right-handed has some changes on the left side of the face which indicate criminal tendencies. The inventor has found out that these changes can be readily detected, and, in fact, magnified as to their appearance and significance by providing means for observing one half of the face at a time and for forming a half image of the observed half of the face which may be observed with the image of a photograph so that a full picture of the face is made having the appearance of the exposed and observed half of the photograph. By this method a fanciful face is produced the opposite sides of which are duplicates, and which face will thus duplicate the irregularities of facial contour and expression which act as an index to character.

In the observation of criminals it has been noticed that by means of this device the defective side of the face will clearly produce the image of a person who could be instantly recognized as being of criminal tendencies. It will therefore be evident that the present invention is of considerable value to criminologists and those studying facial expression and its relation to character.

The present invention contemplates the use of a background or surface upon which a photograph may be placed and upon which it will lie flat, said device carrying a mirror which is relatively thin, and which may be supported with its plane at right angles to the plane of the surface upon which the photograph is laid; said mirror being spaced from the surface to permit the photograph to be inserted between the mirror and the back member so that the mirror may be caused to assume a position along the vertical medium line of a face and to create an image of one half of the face as it appears on the portion of the photograph on either side of the device.

The invention is illustrated by way of example in the accompanying drawing in which:—

Fig. 1 is a view in perspective showing the application of the device, and showing a photograph placed with relation to the mirror for proper operation.

Fig. 2 is a view in end elevation showing the manner in which the mirror is limited in its movement at one end to cause it to stand vertically with relation to one leaf of the back member.

Fig. 3 is a view similar to Fig. 2 showing the opposite end of the device and the limiting means.

Fig. 4 is a view in end elevation showing the mirror device as folded and in a condition to be placed in the pocket or in some convenient small space.

Referring more particularly to the drawing, 10 indicates a mirror. This mirror is preferably made of highly polished metal. It is here shown as formed at its opposite ends with eyes produced by rolling the sheet of metal to form a cylindrical portion, as indicated at 11 and 12. These cylindrical eyes receive the ends of a pintle wire 15. The pintle wire extends through the joint members 17 of leaves 18 and 19, which form the back of the mirror structure when the two leaves are opened and lie flat as indicated in Fig. 1 of the drawing.

It is to be understood that the mirror 10 is frictionally mounted upon the extensions 13 and 14 of the pintle wire 15 so that it may be removed if desired, or at least may be raised so that a photograph 20 may be slipped beneath the lower edge of the mirror and caused to lie flat upon the leaves 18 and 19.

In order to insure that the mirror may assume a position exactly at right angles to the opposite sides of the photograph limiting members 21 and 22 are formed as extensions of the leaves 18 and 19, and as shown in Figs. 2 and 3 of the drawing, these members act as stops against the opposite sides of the mirror and cause the mirror to stand in a position at right angles to the back leaves.

A lock member 23 is provided and may swing over to engage a catch 24 when holding the leaves in their folded position, or may swing in an opposite direction to engage a pin 25 to hold the leaves in their unfolded position.

In operation of the present invention it will be assumed that the structure is folded. It may then be placed in a small leather case or some other container. When it is to be used the catch 24 is unfastened and the leaves 18 and 19 are folded outwardly until they assume a flat position in the same plane. The lock 23 may then be caused to engage the pin 25 on the back of the leaf, and will hold the background, or, in fact the two leaves 18 and 19 in rigid relation to each other. This will provide a flat surface upon which the photograph 20 may be laid. The photograph is then placed on the surface as presented by the leaves 18 and 19, and is inserted beneath the mirror 10. The mirror may then be pressed downwardly on the extensions of the pintle wire so that it will bear directly against the surface of the photograph. The photograph is at the same time adjusted so that the mirror will coincide with the vertical median line of face of the person appearing on the photograph and which face is to be analyzed. After this adjustment has been made it will be observed that the reflection of each half of the photograph will appear on the adjacent mirror surface of the mirror 10.

After the photograph has been thus adjusted it will be observed that the exposed half of the photograph will cast a duplicate half image upon the adjacent reflecting surface and to the observer, the combined showing of the half of the photograph and the image cast will give the likeness of the complete face of the person appearing on the photograph. The difference being, however, that the face will not be entirely that of the person photographed, but will be a fanciful one, carrying duplicate characteristics as to expression and contour. In the event that there are any marks on the face which would be an index of character, either good or bad, it will be readily observed that the existence of such features will be multiplied and emphasized so that it is possible to recognize the criminal or other type of character without difficulty when the half of the photograph and its image is observed simultaneously.

It will also be evident that this device might be used by removing the mirror and holding it on photographs which cannot be placed in the background, but that in any event the mirror when disposed at right angles to the photograph will provide a half image of the face of the person which may be simultaneously observed, with the half image casting this image on the mirror and that the result will be the same as previously described.

It will thus be seen that by the method here disclosed it is possible to use photographs to create imaginary studies of a person, and which studies will accentuate the facial characteristics of the person in a manner to make it possible for these characteristics to be readily noted and analyzed.

While I have shown the preferred form of my invention as now known to me, it will be understood that various changes may be made in the combination, construction and arrangement of parts by those skilled in the art, without departing from the spirit of the invention as claimed.

Having thus described my invention what I claim and desire to secure by Letters Patent is:

1. A device for producing a complete picture composed of an exact duplication of one half only of the face of a person, said device comprising means for supporting a full face photograph in a flat position, a mirror, means for mounting said mirror in longitudinal alignment with the vertical median line of the photograph of the face of a person and at right angles to the surface of the photograph and substantially contiguous thereto, whereby the half of the photograph exposed to the mirror will cast a like image upon the mirror in position to form an unbroken continuation of the photograph to produce a complete fanciful face with the exposed portion of the photograph.

2. A device for producing a complete picture composed of an exact duplication of one half only of the face of a person, said device comprising a background arranged to support a photograph of the full face of the person in a flat position, supporting elements extending from the background at right angles thereto, and a mirror carried by the supporting elements and adapted to be held at right angles to the plane of the background and spaced therefrom to permit the photograph to be placed beneath the mirror and to be removed therefrom and to support the mirror substantially contiguous to the photograph along the median line thereof so as to produce a complete unbroken fanciful face with the exposed portion of the photograph.

3. A device for producing a complete picture composed of an exact duplication of one half only of the face of a person, said device comprising a back structure having complementary leaves hinged to each other along the median line of the back structure, and adapted to be arranged in the same plane to support a photograph of the full face of a person, an intermediate hinge member having opposite mirror faces and mounted upon the pintle of the leaf hinge, said leaves and intermediate member being capable of being folded together, and means for positioning said mirror member at right angles to the plane assumed by the leaves of the back structure when said leaves of said back structure are folded out into a common plane, said mirror being spaced from the back structure to permit a photograph to be placed on the back structure beneath the mirror and to be removed therefrom and arranged substantially contiguous to the photograph when the same is in position upon the background.

4. A device for producing a complete picture composed of an exact duplication of one half only of the face of a person, said device comprising a back structure having complementary leaves hinged to each other along the median line of the back structure, and adapted to be arranged in the same plane to support a photograph of the full face of a person, an intermediate hinge member having opposite mirror faces and mounted upon the pintle of the leaf hinge, said leaves and intermediate member being capable of being folded together, means carried by the leaves for automatically positioning the mirror member at right angles to the plane assumed by the leaves of the back structure when the leaves of said back structure are folded out into a common plane, and means for permitting relative movement of the intermediate member with relation to the back structure when in its position of alignment at right angles thereto to clamp the photograph in position with the mirror substantially contiguous to the photograph and along the median line thereof and release the photograph.

5. A device for producing a complete picture composed of an exact duplication of one half only of the face of a person, said device comprising a background arranged to support a photograph of the full face of a person in a flat position and formed of two leaves hinged along contiguous edges, and a flat mirror member extending along the hinge line and adapted to be supported at right angles to the leaves when they are in the same plane, said mirror being spaced from the background to permit the photograph to be placed beneath the mirror upon the background and to be removed therefrom and arranged substantially contiguous to the photograph along the median line thereof when the photograph is in position upon the said background.

WM. E. BENTON.